(12) United States Patent
Bobert et al.

(10) Patent No.: US 10,084,309 B2
(45) Date of Patent: Sep. 25, 2018

(54) SPARK GAP ARRANGEMENT

(71) Applicant: EPCOS AG, München (DE)

(72) Inventors: Peter Bobert, Falkensee (DE); Eduard Dorsch, Dallgow (DE); Frank Werner, Berlin (DE)

(73) Assignee: EPCOS AG, München (DE)

( * ) Notice: Subject to any disclaimer, the term of this patent is extended or adjusted under 35 U.S.C. 154(b) by 250 days.

(21) Appl. No.: 14/911,155

(22) PCT Filed: Jul. 30, 2014

(86) PCT No.: PCT/EP2014/066404
§ 371 (c)(1),
(2) Date: Feb. 9, 2016

(87) PCT Pub. No.: WO2015/018719
PCT Pub. Date: Dec. 12, 2015

(65) Prior Publication Data
US 2016/0204603 A1    Jul. 14, 2016

(30) Foreign Application Priority Data

Aug. 9, 2013   (DE) .................. 10 2013 108 658

(51) Int. Cl.
| H02H 9/00 | (2006.01) |
| H02H 9/06 | (2006.01) |
| H02H 9/04 | (2006.01) |
| H01T 15/00 | (2006.01) |

(52) U.S. Cl.
CPC .............. *H02H 9/06* (2013.01); *H01T 15/00* (2013.01); *H02H 9/005* (2013.01); *H02H 9/041* (2013.01)

(58) Field of Classification Search
CPC ........................................................ H02H 9/06
USPC ........................................................... 361/56
See application file for complete search history.

(56) References Cited

U.S. PATENT DOCUMENTS

| 3,943,427 A | | 3/1976 | Tolstoy et al. | |
| 4,259,704 A | * | 3/1981 | Hamann | .................. H02H 7/00 361/16 |
| 4,625,254 A | * | 11/1986 | Fahlen | ...................... H02H 9/06 361/16 |
| 4,683,514 A | * | 7/1987 | Cook | ...................... H02H 9/06 361/111 |

(Continued)

FOREIGN PATENT DOCUMENTS

| DE | 2434279 A1 | 1/1976 |
| DE | 19803636 A1 | 8/1999 |

(Continued)

*Primary Examiner* — Stephen W Jackson
(74) *Attorney, Agent, or Firm* — Slater Matsil, LLP

(57) ABSTRACT

A spark gap arrangement includes a triggerable spark gap and a trigger circuit. The spark gap arrangement also includes a first and a second charge storage device, a voltage limiting component, a trigger diode, a triggerable arresting element, and a transformer. The voltage limiting component and the trigger diode are designed to relay an input pulse in a specified voltage range and charge the first charge storage device. Furthermore, the trigger circuit is designed such that the triggerable arresting element is connected via the first charge storage device dependent on the voltage and discharges the second charge storage device via a primary side of the transformer.

18 Claims, 1 Drawing Sheet

(56) References Cited

U.S. PATENT DOCUMENTS

| | | | |
|---|---|---|---|
| 5,995,352 A | 11/1999 | Gumley | |
| 5,999,387 A | 12/1999 | Roesch et al. | |
| 6,111,740 A | 8/2000 | Danowsky et al. | |
| 9,627,859 B2 * | 4/2017 | Bobert | H01T 15/00 |
| 2010/0290169 A1 | 11/2010 | Salovaara et al. | |
| 2012/0008239 A1 | 1/2012 | Chang | |

FOREIGN PATENT DOCUMENTS

| | | |
|---|---|---|
| EP | 0717886 A1 | 6/1996 |
| EP | 0933860 A1 | 8/1999 |
| EP | 1077519 A2 | 2/2001 |
| JP | S5115371 A | 2/1976 |
| JP | 2005237157 A | 9/2005 |
| JP | 2007306774 A | 11/2007 |

* cited by examiner

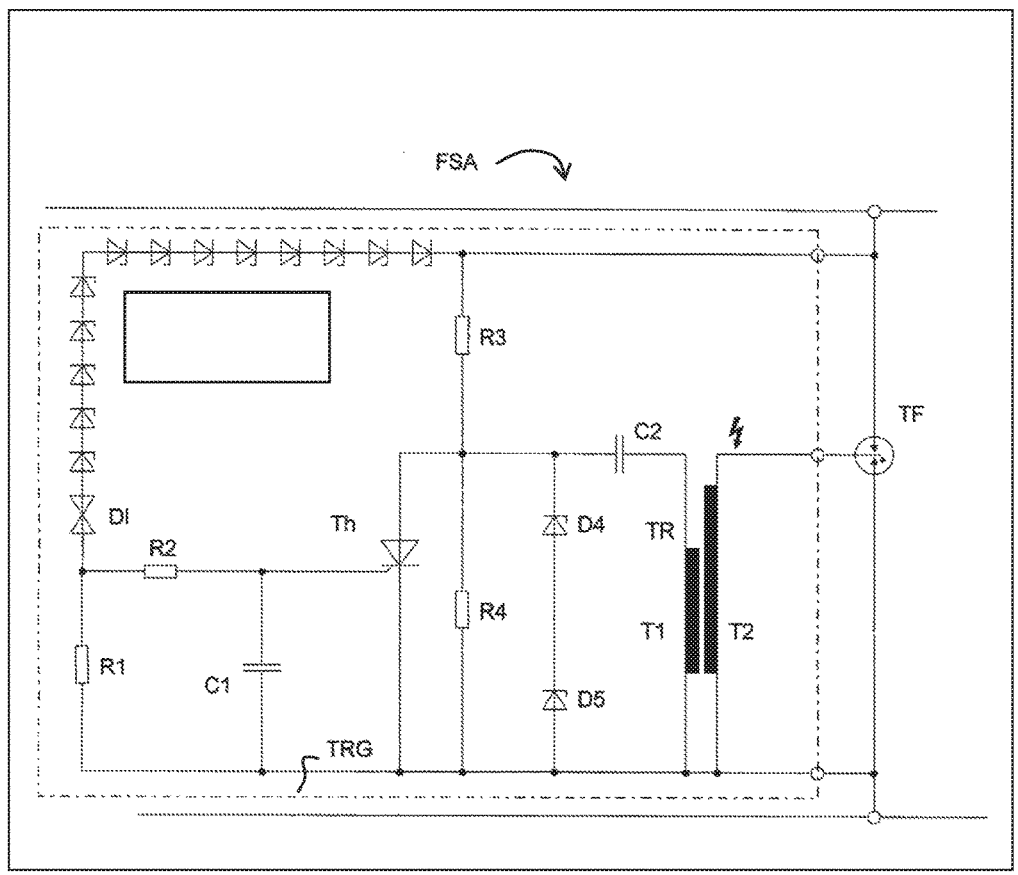

SPARK GAP ARRANGEMENT

This patent application is a national phase filing under section 371 of PCT/EP2014/066404, filed Jul. 30, 2014, which claims the priority of German patent application 10 2013 108 658.6, filed Aug. 9, 2013, each of which is incorporated herein by reference in its entirety.

TECHNICAL FIELD

The invention relates to a spark gap arrangement with a triggerable spark gap.

BACKGROUND

Conventional triggerable spark gaps normally have at least three electrodes. For example, the electrodes are arranged in a gas-filled space, wherein a spark gap between the electrodes is ignited by applying a corresponding voltage to one of the electrodes, preferably a trigger electrode. An ionized gap, for example, via which a current flows between the electrodes, is created in the gas-filled space.

Triggerable spark gaps of this type may, for example, be components of surge arresters which are intended to protect electrical components, in particular electrical components operated with a direct voltage, against a surge voltage. For this purpose, the triggerable spark gap can be connected to an operating voltage of the respective electrical component. For example, in the event of a sudden voltage increase, the triggerable spark gap can short-circuit the applied operating voltage. The triggerable spark gap is furthermore appropriately connected to a safety cut-out wherein, as soon as the current flows between the electrodes of the triggerable spark gap, i.e., the triggerable spark gap ignites or triggers, the safety cut-out responds and interrupts the power circuit of the electrical component.

SUMMARY

Embodiments of the invention provide a spark gap arrangement in which the triggerable spark gap ignites in a predefined voltage range.

A proposed spark gap arrangement comprises a triggerable spark gap and a trigger circuit which comprises a first and a second charge storage device, a voltage-limiting component, a trigger diode, a triggerable arresting element and a transformer. The voltage-limiting component may, for example, comprise one or more semiconductor diodes. The voltage-limiting component and the trigger diode are designed to through-connect an input pulse in a predetermined voltage range and charge the first charge storage device.

The input pulse may be an unwanted electrical voltage pulse which is, in particular, damaging to further connected electrical components and is caused, for example, by a malfunction or destruction of parts of the circuit.

The triggerable spark gap is configured in such a way that the triggerable arresting element through-connects in a voltage-dependent manner via the first charge storage device and discharges the second charge storage device via a primary side of the transformer. A secondary side of the transformer is connected to the triggerable spark gap. One advantage of the spark gap arrangement relates to the possibility of operating as surge voltage protection, for example, in the case of electronically controlled voltage converters or voltage transformers which have voltage-sensitive elements or components. The trigger circuit is provided, in particular, to achieve a voltage tolerance that meets specific requirements in the interaction with the spark gap arrangement, said tolerance not being achievable with a triggerable spark gap alone.

In one preferred design, the predetermined voltage range is between 420 volts 480 volts. One useful result of this design is that an input pulse is through-connected by the voltage-limiting component precisely in the aforementioned voltage range. This enables the triggerable spark gap to trigger or ignite. The predefined voltage range is usefully less than a maximum voltage of the electrical component which is intended to be protected against a surge voltage.

In one preferred design, a direct voltage is applied to the trigger circuit as an operating voltage.

In one preferred design, an operating voltage between 380 volts and 420 volts is applied to the trigger circuit. Through this design, the spark gap arrangement can be adapted, for example, for an application in electronically controlled voltage transformers which are operated with this operating voltage.

In one preferred design, the voltage at which the voltage-limiting component through-connects the input pulse depends on the operating temperature of the trigger circuit. This dependence may result, for example, from a thermal drift behavior of a characteristic voltage of the voltage-limiting component.

In one preferred design, the voltage-limiting component comprises a plurality of Zener diodes. A voltage-limiting component that is adapted to the predefined voltage range can be particularly usefully indicated through this design. The Zener diodes are preferably connected in series in the trigger circuit so that the operating voltage drops evenly over the Zener diodes. The Zener diodes or their number can be dimensioned or adapted in such a way that the input pulse is through-connected by the Zener diodes in the predefined voltage range. The number of Zener diodes or the Zener diodes themselves are preferably adapted or dimensioned in such a way that the voltage-limiting component through-connects the input pulse only if the voltage of the input pulse lies within the predetermined voltage range.

The trigger circuit may alternatively comprise a series resistor which is connected in series with the Zener diodes in order to restrict the voltage which drops over the Zener diodes in relation to the operating voltage by the voltage which drops over the series resistor.

In one preferred design, the voltage-limiting component is designed in such a way that tolerances of the breakdown voltages of the Zener diodes or the breakdown voltages themselves define the predetermined voltage range. The breakdown voltages or Zener voltages may be temperature-dependent. The tolerances of the breakdown voltages of the Zener diodes are preferably temperature-determined tolerances.

In one preferred design, the voltage-limiting component comprises thirteen Zener diodes, each with a breakdown voltage of 33 volts. This design enables the temperature-dependent drift of the breakdown voltages to define the predetermined voltage range in such a way that the voltage-limiting component through-connects the input pulse within the limits of the predetermined voltage range. Furthermore, a through-connection voltage of the voltage-limiting component may be set, for example, to around 420 volts or to a different voltage.

The positive temperature coefficient of the breakdown voltages of the Zener diodes usefully enables this breakdown voltage to be extended or distributed in a temperature-determined manner over a voltage range, in particular the predefined voltage range, so that it can be ensured that the input pulse is through-connected by the voltage-limiting component in the predefined voltage range.

In one preferred design, the sum of the breakdown voltages of the Zener diodes defines a lower limit of the predefined voltage range.

In one preferred design, the maximum temperature drift of the breakdown voltages during an operation of the trigger circuit defines the upper limit of the predefined voltage range. In particular, the upper limit of the predefined voltage range can be defined by the maximum through-connection voltage of the Zener diodes during the operation of the trigger circuit.

In one preferred design, the triggerable arresting element comprises a thyristor, wherein the trigger diode is connected in series with the voltage-limiting component and is configured to switch the thyristor to a conducting state depending on the voltage over the first charge storage device. Thus, if the voltage over the first charge storage device reaches the through-connection voltage, the trigger diode is switched to a conducting state so that a control current is fed to the control electrode of the thyristor in order to ignite the latter or switch it to a conducting state. The thyristor is connected to the second charge storage device in such a way that a discharge takes place via the primary side of the transformer.

In one preferred design, the trigger circuit comprises a first resistor, wherein the first resistor is configured in such a way that the second charge storage device is charged in the operation of the trigger circuit to a voltage between 280 volts and 320 volts, preferably 300 volts.

In one preferred design, the trigger circuit comprises a second resistor, wherein the trigger circuit is configured to charge the first charge storage device via the second resistor by means of the input pulse. The first charge storage device may be a capacitor, in particular a decoupling capacitor, in order to prevent an unwanted through-connection of the thyristor.

In one preferred design, the trigger circuit comprises a further voltage-limiting component which is configured to limit the voltage on the primary side of the transformer to a predefined value. The limitation is preferably a surge voltage protection of the primary side of the transformer. The predefined value may be a predefined maximum voltage of the primary side of the transformer.

In one preferred design, the trigger circuit comprises a third resistor, wherein the trigger circuit is configured in such a way that the first resistor and the third resistor form a voltage divider for the operating or primary voltage of the trigger circuit and/or the transformer. The voltage to which the second charge storage device is charged in the operation of the trigger circuit can advantageously be determined via the resistance values of the first resistor and the third resistor or the dimensioning of the voltage divider.

In one preferred design, the spark gap arrangement has a safety cut-out which is connected to the triggerable spark gap, wherein the safety cut-out is configured to disconnect an electrical component from the operating voltage. The electrical component may be an electronic element which is intended to be protected by the spark gap arrangement against a surge voltage.

In one preferred design, the trigger circuit is integrated into a housing together with the triggerable spark gap.

In one preferred design, the triggerable spark gap is a gas discharge spark gap or gas-filled electrical surge arrester.

A further aspect relates to an electronic element with the spark gap arrangement. The electronic element has the electrical component, wherein the electronic element is configured in such a way that the operating voltage is applied to the electrical component. Through this design, the spark gap arrangement can advantageously be adapted to the operating voltage of the electrical component so that the electrical component can be protected by the spark gap arrangement against a surge voltage which could destroy the electrical component.

In one preferred design, the electrical component is a super-capacitor which has a maximum electrical voltage of 500 volts. The super-capacitor can be used to stabilize the operating voltage, for example, for an application of the spark gap arrangement in voltage transformers.

In one preferred design of the electronic element, said element is a, preferably electronically controlled, direct voltage transformer.

BRIEF DESCRIPTION OF THE DRAWINGS

Further advantages, advantageous designs and useful applications of the invention are indicated in the following description of the example embodiments in conjunction with the figures.

The sole Figure shows schematically at least parts of a spark gap arrangement with a trigger circuit.

DETAILED DESCRIPTION OF ILLUSTRATIVE EMBODIMENTS

The spark gap arrangement FSA comprises a trigger circuit TRG and a triggerable spark gap TF. The triggerable spark gap is, for example, a gas discharge spark gap or a gas-filled electrical surge arrester. The trigger circuit TRG is connected to the triggerable spark gap TF. The triggerable spark gap is furthermore preferably connected to a safety cut-out (not explicitly shown) which is configured to respond as soon as the triggerable spark gap is triggered or ignites. The safety cut-out is preferably provided to disconnect from the operating voltage an electrical component which is to be protected against a surge voltage and which can be connected to the trigger circuit.

The trigger circuit TRG comprises a transformer TR. The transformer TR may be a high voltage transformer. A primary winding T1 of the transformer is shown as smaller than a secondary winding T2 in order to indicate that a voltage transformation is carried out by the transformer TR between the primary side T1 and the secondary side T2 of the transformer TR.

As shown in the Figure, the trigger circuit TRG comprises a series circuit of Zener diodes, preferably 13 Zener diodes. The Zener diodes preferably each have a breakdown voltage or Zener voltage of 33 volts. In this way, the voltage-limiting component SBK can be designed in such a way that tolerances of the breakdown voltages of the Zener diodes of the voltage-limiting component SBK define the predetermined voltage range.

The breakdown voltages of the Zener diodes may be temperature-dependent. The voltage breakdown of the Zener diodes can be caused by the avalanche effect. The temperature coefficient of the breakdown voltages of the Zener diodes may accordingly be positive. The tolerances of the breakdown voltages of the Zener diodes are preferably temperature-determined tolerances.

A series resistor R1 is furthermore connected in series with the Zener diodes. The Zener diodes shown in the Figure represent by way of example a voltage-limiting component SBK of the spark gap arrangement FSA. The voltage drop over the voltage-limiting component SBK can be set, for example, via the dimensioning of the resistor R1.

The trigger circuit TRG furthermore comprises a trigger diode or diac DI. The trigger diode DI is connected in series with the voltage-limiting component SBK.

The trigger circuit TRG furthermore comprises a first resistor R3 and a second resistor R2.

The first resistor R3 may, for example, have a resistance value of 6.8 MΩ. The trigger circuit TRG furthermore comprises a first charge storage device C1. The trigger circuit TRG furthermore comprises a second charge storage device C2. The second charge storage device C2 is connected with one terminal to the resistors R3 and R4 and with a second terminal to the primary winding T1 of the transformer TR. The capacitance of the second charge storage device may, for example, be 47 nF.

The second resistor R2 is connected in series with a first charge storage device C1. The second resistor R2 and the first charge storage device C1 are connected in parallel with the resistor R1. The first charge storage device C1 is furthermore charged via the second resistor R2.

The voltage-limiting component SBK and the trigger diode DI are furthermore configured or designed to through-connect an input pulse caused, for example, by a surge, in a predetermined voltage range and to charge the first charge storage device C1 via the second resistor R2.

An input pulse due to a surge voltage of this type may be caused, for example, by the failure or destruction of a component of the circuit or application in which the spark gap arrangement FSA is used. The spark gap arrangement FSA may be used, for example, in direct voltage transformers. A component of this type may, for example, be an output transistor of the aforementioned direct voltage transformer.

The trigger circuit furthermore has a third resistor R4 which, together with the first resistor R3, forms a voltage divider for the applied operating voltage. The second charge storage device C2 is connected in parallel with the third resistor R4.

The third resistor R4 may, for example, have a resistance value of 20 MΩ. The voltage to which the second charge storage device C2 is charged in the operation of the trigger circuit TRG is determined via the voltage divider or the dimensioning of the first resistor R3 and the third resistor R4. The trigger circuit TRG is preferably designed for a direct voltage operation. An operating voltage between 380 volts and 420 volts, preferably 400 volts, is preferably applied to the trigger circuit TRG.

The trigger circuit TRG furthermore comprises a thyristor TH. A sufficient charge quantity or voltage preferably remains on the second charge storage device C2 in operation to produce a sufficient voltage pulse in the transformer TR in the event of the short circuit via the thyristor TH.

The trigger circuit TRG furthermore comprises a further voltage-limiting component which is represented by way of example by the Zener diodes D4 and D5. The further voltage-limiting component is connected in parallel with the third resistor R4. The further voltage-limiting component is furthermore configured to protect the voltage on the primary side T1 of the transformer TR against a surge voltage.

In the operation of the spark gap arrangement FSA, the charge storage device C2 is charged, for example, via the first resistor R3 to a voltage between 280 volts and 320 volts, preferably around 300 volts. The first voltage-limiting component SBK is preferably designed in such a way that it through-connects an input pulse in a predefined voltage range between 420 and 480 volts.

Following the through-connection of the input pulse, the first charge storage device C1 is charged via the second resistor R2. The thyristor TH is ignited accordingly by the charge voltage of the first charge storage device C1 so that a low-impedance connection is set up between the second charge storage device C2 and the lower terminal of the primary winding T1. In other words, the second charge storage device is short-circuited via the thyristor TH and the primary winding T1. Consequently, a voltage pulse is generated in the primary winding T1 of the transformer TR and is stepped up on the secondary side T2, resulting in a voltage pulse on the triggerable spark gap TF. This voltage pulse then results in turn in a triggering or activation or ignition of the triggerable spark gap TF.

The spark gap arrangement FSA can be provided in an electronic element or for an electronic circuit (see above). This electronic element or the circuit (not explicitly shown) may comprise an electrical component, for example, a super-capacitor (not explicitly shown) which is protected by the spark gap arrangement against a surge voltage which preferably corresponds to the operating voltage of the trigger circuit TRG. A maximum voltage of a super-capacitor of this type is preferably 500 volts.

Alternatively, a maximum voltage of the electrical component may have a different voltage value.

Although this is not explicitly described, the present description similarly comprises dimensionings of the components of the trigger circuit which are not explicitly named here. In particular, the predefined voltage range can be selected differently and/or can be adapted to an operating voltage or maximum voltage other than that described.

The invention is not restricted by the description referring to the example embodiments. On the contrary, the invention comprises any novel feature and any combination of features, including, in particular, any combination of features in the patent claims, even if this feature or combination itself is not explicitly indicated in the patent claims or example embodiments.

We claim:

1. A spark gap arrangement comprising:
a triggerable spark gap; and
a trigger circuit which comprises a first charge storage device, a second charge storage device, a voltage-limiting component, a trigger diode, a triggerable arresting element and a transformer;
wherein the voltage-limiting component and the trigger diode are designed to through-connect an input pulse in a predetermined voltage range and charge the first charge storage device;
wherein the trigger circuit is configured in such a way that the triggerable arresting element through-connects in a voltage-dependent manner via the first charge storage device and discharges the second charge storage device via a primary side of the transformer;
wherein a secondary side of the transformer is connected to the triggerable spark gap; and
wherein the trigger circuit comprises a further voltage-limiting component that is configured to limit a voltage on the primary side of the transformer to a predefined value.

2. The spark gap arrangement according to claim 1, wherein the predetermined voltage range is between 420 volts and 480 volts.

3. The spark gap arrangement according to claim 1, wherein an operating voltage is between 380 volts and 420 volts, the spark gap arrangement configured to operate when the operating voltage is applied to an input of the trigger circuit.

4. The spark gap arrangement according to claim 1, wherein the voltage-limiting component comprises a plurality of Zener diodes.

5. The spark gap arrangement according to claim 4, wherein the voltage-limiting component is designed in such a way that breakdown voltages of the Zener diodes define the predetermined voltage range.

6. The spark gap arrangement according to claim 1, wherein the voltage-limiting component comprises 13 Zener diodes, each Zener diode having a breakdown voltage of 33 volts.

7. The spark gap arrangement according to claim 1, wherein the triggerable arresting element comprises a thyristor, and wherein the trigger diode is connected in series with the voltage-limiting component and is configured to switch the thyristor to a conducting state depending on a voltage over the first charge storage device.

8. The spark gap arrangement according to claim 1, wherein the trigger circuit comprises a first resistor and a second resistor;
wherein the trigger circuit is configured in such a way that the second charge storage device is charged during operation of the trigger circuit to a voltage between 280 volts and 320 volts; and
wherein the trigger circuit is configured to charge the first charge storage device via the second resistor by use of the input pulse.

9. The spark gap arrangement according to claim 1, wherein the trigger circuit comprises a first resistor that is configured in such a way that the second charge storage device is charged during operation of the trigger circuit to a voltage between 280 volts and 320 volts.

10. The spark gap arrangement according to claim 9, wherein the trigger circuit comprises a third resistor, and wherein the trigger circuit is configured so that the first resistor and the third resistor form a voltage divider for a primary voltage of the transformer.

11. The spark gap arrangement according to claim 1, wherein the trigger circuit comprises a second resistor, wherein the trigger circuit is configured to charge the first charge storage device via the second resistor by use of the input pulse.

12. The spark gap arrangement according to claim 1, wherein the spark gap arrangement has a safety cut-out that is connected to the triggerable spark gap, wherein the safety cut-out is configured to disconnect an electrical component from an operating voltage.

13. An electronic element comprising a spark gap arrangement according to claim 1 and an electrical component, wherein the electronic element is configured in such a way that an operating voltage is applied to the electrical component.

14. The electronic element according to claim 13, wherein the electrical component comprises a super-capacitor that has a maximum electrical voltage of 500 volts.

15. A spark gap arrangement comprising:
a triggerable spark gap; and
a trigger circuit which comprises a first charge storage device, a second charge storage device, a voltage-limiting component, a trigger diode, a triggerable arresting element and a transformer;
wherein the voltage-limiting component comprises a plurality of Zener diodes;
wherein the voltage-limiting component and the trigger diode are designed to through-connect an input pulse in a predetermined voltage range and charge the first charge storage device;
wherein the trigger circuit is configured in such a way that the triggerable arresting element through-connects in a voltage-dependent manner via the first charge storage device and discharges the second charge storage device via a primary side of the transformer; and
wherein a secondary side of the transformer is connected to the triggerable spark gap.

16. The spark gap arrangement according to claim 15, wherein the voltage-limiting component is designed in such a way that breakdown voltages of the Zener diodes define the predetermined voltage range.

17. The spark gap arrangement according to claim 15, wherein the voltage-limiting component comprises 13 Zener diodes, each Zener diode having a breakdown voltage of 33 volts.

18. A spark gap arrangement comprising:
a triggerable spark gap; and
a trigger circuit which comprises a first charge storage device, a second charge storage device, a voltage-limiting component, a trigger diode, a triggerable arresting element and a transformer;
wherein the voltage-limiting component and the trigger diode are designed to through-connect an input pulse in a predetermined voltage range and charge the first charge storage device;
wherein the trigger circuit is configured in such a way that the triggerable arresting element through-connects in a voltage-dependent manner via the first charge storage device and discharges the second charge storage device via a primary side of the transformer;
wherein a secondary side of the transformer is connected to the triggerable spark gap
wherein the triggerable arresting element comprises a thyristor; and
wherein the trigger diode is connected in series with the voltage-limiting component and is configured to switch the thyristor to a conducting state depending on a voltage over the first charge storage device.

* * * * *

UNITED STATES PATENT AND TRADEMARK OFFICE
CERTIFICATE OF CORRECTION

PATENT NO. : 10,084,309 B2
APPLICATION NO. : 14/911155
DATED : September 25, 2018
INVENTOR(S) : Peter Bobert et al.

Page 1 of 1

It is certified that error appears in the above-identified patent and that said Letters Patent is hereby corrected as shown below:

On the Title Page

Item (87), Line 2, delete "PCT Pub. Date: Dec. 12, 2015" and insert --PCT Pub. Date: Feb. 12, 2015--.

Signed and Sealed this
Fourth Day of December, 2018

Andrei Iancu
*Director of the United States Patent and Trademark Office*